(12) United States Patent
Nakano

(10) Patent No.: US 9,296,880 B2
(45) Date of Patent: Mar. 29, 2016

(54) RUBBER COMPOSITION FOR CONVEYOR BELTS, CONVEYOR BELT, AND BELT CONVEYOR

(71) Applicant: BRIDGESTONE CORPORATION, Chou-ku, Tokyo (JP)

(72) Inventor: Hiroki Nakano, Yokohama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 14/364,345

(22) PCT Filed: Dec. 10, 2012

(86) PCT No.: PCT/JP2012/081955
§ 371 (c)(1),
(2) Date: Jun. 11, 2014

(87) PCT Pub. No.: WO2013/089069
PCT Pub. Date: Jun. 20, 2013

(65) Prior Publication Data
US 2015/0001047 A1  Jan. 1, 2015

(30) Foreign Application Priority Data

Dec. 12, 2011 (JP) ................................. 2011-271378
Aug. 3, 2012 (JP) ................................. 2012-172821

(51) Int. Cl.
*B65G 15/32* (2006.01)
*C08L 9/00* (2006.01)
*C08L 7/00* (2006.01)

(52) U.S. Cl.
CPC . *C08L 9/00* (2013.01); *B65G 15/32* (2013.01); *C08L 7/00* (2013.01)

(58) Field of Classification Search
CPC ............ B65G 15/32; C08K 3/04; C08L 7/00; C08L 9/00
See application file for complete search history.

(56) References Cited

U.S. PATENT DOCUMENTS 4,145,376 A * 3/1979 Bracke et al. .................... 525/99
4,154,776 A * 5/1979 Bracke et al. .................... 525/99
(Continued)

FOREIGN PATENT DOCUMENTS

CN 101028888 A 9/2007
CN 102504726 A 6/2012
(Continued)

OTHER PUBLICATIONS

EPO Patent Translate, Translation of JP2000169630, 2015.*
(Continued)

*Primary Examiner* — Mark A Deuble
(74) *Attorney, Agent, or Firm* — Sughrue Mion, PLLC

(57) ABSTRACT

Provided is a rubber composition for conveyor belts capable of satisfying both energy efficiency and durability. Concretely provided is a rubber composition for conveyor belts comprising (A) 100 parts by mass of a dienic polymer, and (B) from 25 to 55 parts by mass of carbon black including carbon black (b-1) having a nitrogen-adsorbing specific surface area of from 60 to 100 $m^2/g$ and a dibutyl phthalate oil absorption of less than 110 ml/100 g, and carbon black (b-2) having a nitrogen-adsorbing specific surface area of less than 60 $m^2/g$ and a dibutyl phthalate oil absorption of at least 110 ml/100 g. Further provided are a conveyor belt obtained using the rubber composition for conveyor belts, and a belt conveyor having the conveyor belt mounted thereto.

8 Claims, 1 Drawing Sheet

(56) References Cited

U.S. PATENT DOCUMENTS

| | | | |
|---|---|---|---|
| 4,360,627 A | 11/1982 | Okado et al. | |
| 2007/0060692 A1* | 3/2007 | Kniajanski et al. | 524/430 |
| 2009/0101258 A1 | 4/2009 | Nakamura | |
| 2012/0067706 A1 | 3/2012 | Terada et al. | |
| 2013/0274375 A1* | 10/2013 | Matsushita | 523/156 |

FOREIGN PATENT DOCUMENTS

| | | | | |
|---|---|---|---|---|
| EP | 2792709 A1 * | 10/2014 | | B65G 13/32 |
| JP | 7-324144 A | 12/1995 | | |
| JP | 11-49893 A | 2/1999 | | |
| JP | 11-139523 A | 5/1999 | | |
| JP | 11-153168 A | 6/1999 | | |
| JP | 2000-169630 A | 6/2000 | | |
| JP | 2003-128844 A | 5/2003 | | |
| JP | 2004-346220 A | 12/2004 | | |
| JP | 2008-38133 A | 2/2008 | | |
| JP | 2009-292960 A | 12/2009 | | |
| JP | 2010-6859 A | 1/2010 | | |
| JP | 2010-95584 A | 4/2010 | | |

OTHER PUBLICATIONS

International Search Report of PCT/JP2012/081955, dated Mar. 19, 2013.
Communication dated Aug. 17, 2015, from the European Patent Office in counterpart European Application No. 12858665.8.
Communication dated Dec. 21, 2015 from the State Intellectual Property Office of the P.R.C. in counterpart application No. 201280069424.2.

* cited by examiner

RUBBER COMPOSITION FOR CONVEYOR BELTS, CONVEYOR BELT, AND BELT CONVEYOR

CROSS REFERENCE TO RELATED APPLICATIONS

This application is a National Stage of International Application No. PCT/JP2012/081955 filed Dec. 10, 2012, claiming priority based on Japanese Patent Application Nos. 2011-271378, filed Dec. 12, 2011 and 2012-172821, filed Aug. 3, 2012, the contents of all of which are incorporated herein by reference in their entirety.

TECHNICAL FIELD

The present invention relates to a rubber composition for conveyor belts, a conveyor belt obtained using the rubber composition for conveyor belts, and a belt conveyor having the conveyor belt mounted thereto.

BACKGROUND ART

Belt conveyors are used as means for conveying various packages such as materials, foods, etc. Recently, with growth in traffic volume and increase in transport efficiency, large-sized belt conveyors have become used, and those of which the overall length reaches a few km have come in use. Accordingly, higher durability is desired and reduction in power consumption is also desired.

The belt (conveyor belt) to be mounted to the belt conveyor generally has a core as a reinforcing member inside it, and the core is sandwiched between a cover rubber on the upside of the core (that is to be the outer periphery when used in a conveyor belt) [hereinafter referred to as an external cover rubber) and a cover rubber on the inner periphery (that is to be the back or the lower side, when used in a conveyor belt) [hereinafter referred to as internal cover rubber]. The external cover rubber and the internal cover rubber positioned on the back thereof differ in point of the necessary physical properties, and the internal cover rubber must have tear resistance, and furthermore, must reduce the energy loss owing to contact between the conveyor belt and a large number or rollers, or that is, must reduce the amount of power consumption through energy loss reduction.

Heretofore, as a rubber composition for conveyor belts excellent in tear resistance, there are known a rubber composition that comprises natural rubber (NR) and, as incorporated thereinto, butadiene rubber (BR) and styrene-butadiene rubber (SBR) in a different combination, etc. (see Patent document 1 and 2).

CITATION LIST

Patent Literature

Patent document 1: JP-A 11-139523
Patent document 2: JP-A 2004-346220

SUMMARY OF INVENTION

Technical Problem

The rubber composition described in Patent document 1 and 2 contains styrene-butadiene rubber (SBR) and therefore has good tear resistance, but is poor in energy efficiency since the internal loss thereof is great.

Accordingly, the object of the present invention is to provide a rubber composition for conveyor belts that satisfies both energy efficiency and durability, to provide a conveyor belt having both energy efficiency and durability, and to provide a belt conveyor having the conveyor belt mounted thereto.

Solution to Problem

For achieving the above-mentioned object, the present inventor has made assiduous studies and, as a result, have found that a rubber composition containing a dienic polymer and two specific types of carbon black in a specific ratio can achieve the above-mentioned object. The present invention has been completed on the basis of these findings.

Specifically, the present invention relates to the following [1] to [8].

[1] A rubber composition for conveyor belts, comprising:
(A) 100 parts by mass of a dienic polymer, and
(B) from 25 to 55 parts by mass of carbon black including carbon black (b-1) having a nitrogen-adsorbing specific surface area of from 60 to 100 $m^2/g$ and a dibutyl phthalate oil absorption of less than 110 ml/100 g, and carbon black (b-2) having a nitrogen-adsorbing specific surface area of less than 60 $m^2/g$ and a dibutyl phthalate oil absorption of at least 110 ml/100 g.
[2] The rubber composition for conveyor belts according to the above [1], wherein the content ratio [(b-1)/(b-2)] of the carbon black (b-1) to the carbon black (b-2) is, by mass ratio, from 20/80 to 80/20.
[3] The rubber composition for conveyor belts according to the above [1] or [2], further comprising:
(C) from 1 to 15 parts by mass of silica, and
(D) from 0.1 to 1.5 parts by mass of a silane coupling agent.
[4] The rubber composition for conveyor belts according to any one of the above [1] to [3], wherein the component (A) comprises from 15 to 65% by mass of at least one selected from natural rubber and isoprene rubber, and from 85 to 35% by mass of butadiene rubber.
[5] The rubber composition for conveyor belts according to the above [4], wherein the cis-1,4-bond content in the butadiene rubber is at least 90%.
[6] The rubber composition for conveyor belts according to any one of the above [1] to [5], further comprising from 0.1 to 10 parts by mass of an antiaging agent.
[7] A conveyor belt obtained using the rubber composition of any one of the above [1] to [6].
[8] A belt conveyor having, mounted thereto, the conveyor belt of the above [7].

Advantageous Effects of Invention

According to the present invention, there are provided a rubber composition for conveyor belts that satisfies both energy efficiency and durability, a conveyor belt having both energy efficiency and durability, and a belt conveyor having the conveyor belt mounted thereto.

Further, the rubber composition for conveyor belts, which further contains a specific amount of silica and a specific amount of a silane coupling agent, stably has extremely high durability irrespective of the difference in any delicate production condition and kneading condition. Accordingly, the present invention can provide a rubber composition for conveyor belts that satisfies both energy efficiency and extremely high durability.

DESCRIPTION OF EMBODIMENTS

Rubber Composition for Conveyor Belts

Figure 1:
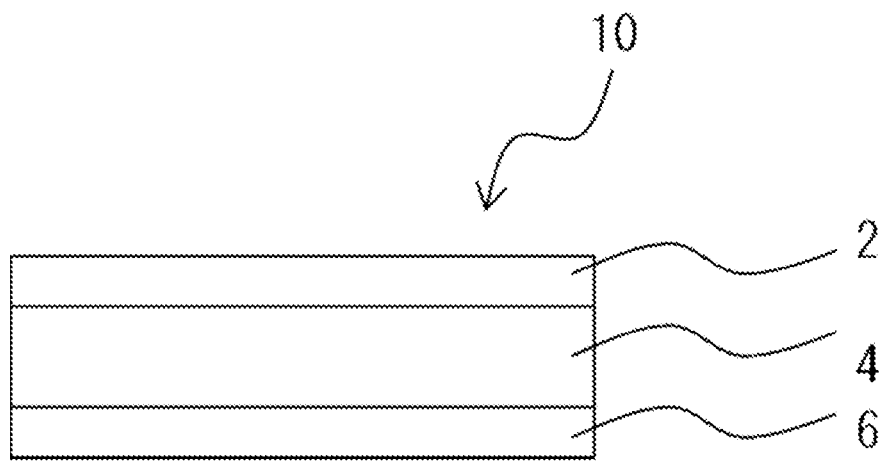
FIG. 1 is a side view of a conveyor belt in accordance with the present invention.

The rubber composition for conveyor belts of the present invention contains:

(A) 100 parts by mass of a dienic polymer, and (B) from 25 to 55 parts by mass of carbon black including carbon black (b-1) having a nitrogen-adsorbing specific surface area of from 60 to 100 $m^2/g$ and a dibutyl phthalate (DBP) oil absorption of less than 110 ml/100 g, and carbon black (b-2) having a nitrogen-adsorbing specific surface area of less than 60 $m^2/g$ and a DBP oil absorption of at least 110 ml/100 g. The conveyor belt obtained using the rubber composition has both energy efficiency and durability.

The components of the rubber composition for conveyor belts of the present invention are described below. In this specification, the preferred descriptions can be employed arbitrarily and can be combined arbitrarily. Combinations of preferred descriptions can be said to be more preferred.

((A) Dienic Polymer)

The dienic polymer of the component (A) includes, for example, natural rubber (NR), isoprene rubber (IR), butadiene rubber (BR), styrene-butadiene rubber (SBR), ethylene-propylene rubber (EPR), ethylene-propylene-diene rubber (EPDM), butyl rubber (IIR), halogenobutyl rubber, chloroprene rubber, etc. One alone or two or more of these may be used here either singly or as combined. In the present invention, preferably, two or more are combined from the viewpoint of satisfying both energy efficiency and durability; and more preferably, at least two selected from natural rubber, isoprene rubber and butadiene rubber are combined, even more preferably at least one selected from natural rubber and isoprene rubber is combined with butadiene rubber, and especially preferably natural rubber or isoprene rubber is combined with butadiene rubber.

Preferably, the component (A) comprises from 15 to 65% by mass of at least one selected from natural rubber and isoprene rubber and from 85 to 35% by mass of butadiene rubber, from the viewpoint of satisfying both energy efficiency and durability and more preferably comprises from 20 to 60% by mass of at least one selected from natural rubber and isoprene rubber and from 80 to 40% by mass of butadiene rubber.

Preferably, butadiene rubber is high-cis butadiene rubber from the viewpoint of satisfying both energy efficiency and durability. The high-cis butadiene rubber is one having a cis-1,4 bond content in the 1,3-butadiene unit therein is from 90% to less than 98%, as measured through FT-IR. Preferably, the cis-1,4 bond content in the 1,3-butadiene unit in the high-cis butadiene rubber is from 95% to less than 98%. The production method for the high-cis butadiene rubber is not specifically defined, and the rubber may be produced according to a known method. For example, the rubber may be produced through polymerization of butadiene using a neodymium-based catalyst. High-cis butadiene rubber is commercially available, and for example, JSR's "BR01", "T700" and the like are usable here.

((B) Carbon Black)

As the carbon black of the component (B), combined here are carbon black (b-1) having a nitrogen-adsorbing specific surface area of from 60 to 100 $m^2/g$ and a DBP oil absorption of less than 110 ml/100 g, and carbon black (b-2) having a nitrogen-adsorbing specific surface area of less than 60 $m^2/g$ and a DBP oil absorption of at least 110 ml/100 g, from the viewpoint of satisfying both energy efficiency and durability.

The carbon black of the component (b-1) preferably has a nitrogen-adsorbing specific surface area of from 70 to 90 $m^2/g$ and a DBP oil absorption of from 60 to 108 ml/100 g from the viewpoint of durability, more preferably a nitrogen-adsorbing specific surface area of from 70 to 90 $m^2/g$ and a DBP oil absorption of from 65 to 108 ml/100 g. The component (b-1) alone could be effective for enhancing durability, but tends to be ineffective for securing energy efficiency. One alone or two or more may be used here for the component (b-1) either singly or as combined.

The carbon black of the component (b-2) preferably has a nitrogen-adsorbing specific surface area of from 30 to 55 $m^2/g$ and a DBP oil absorption of from 110 to 140 ml/100 g from the viewpoint of energy efficiency, more preferably a nitrogen-adsorbing specific surface area of from 35 to 50 $m^2/g$ and a DBP oil absorption of from 115 to 130 ml/100 g. The component (b-2) alone could be effective for enhancing energy efficiency, but tends to be ineffective for securing durability. One alone or two or more may be used here for the component (b-2) either singly or as combined.

In this specification, the nitrogen-adsorbing specific surface area and the DBP oil absorption of carbon black are measured according to JIS K 6217 (1997).

Preferably, the content ratio [(b-1)/(b-2)] of the component (b-1) to the component (b-2) is, by mass, from 10/90 to 90/10, more preferably from 15/85 to 90/10, even more preferably 20/80 to 80/20, still more preferably from 40/60 to 80/20, especially preferably from 50/50 to 70/30. The content ratio falling within the range enhances both energy efficiency and durability.

The carbon black may be any one produced according to any method of a furnace method, a channel method, an acetylene method, a thermal method or the like, and especially preferred is one produced according to a furnace method. Concretely, the carbon black includes standard varieties of SAF, ISAF, HAF, FEF, GPE, SRF (all furnace black for rubber), MT carbon black (pyrolytic carbon), etc. From the above, the carbon black satisfying the above requirements may be suitably selected and used here. Of those, preferred are the above-mentioned ones of furnace black for rubber, and more preferred are HAF and FEF.

In the rubber composition for conveyor belts of the present invention, the content of the component (B) [including any other carbon black than the component (b-1) and the component (b-2) (hereinafter referred to as carbon black (b-3)] is from 25 to 55 parts by mass relative to 100 parts by mass of the component (A). When the content is less than 25 parts by mass, then the durability is poor. On the other hand, when more than 55 parts by mass, then the energy efficiency is insufficient. From the same viewpoint, the content of the component (B) is preferably from 25 to 50 parts by mass relative to 100 parts by mass of the component (A), more preferably from 30 to 50 parts by mass, even more preferably from 35 to 50 parts by mass.

In the component (B), the total content ratio of the component (b-1) and the component (b-2) is preferably at least 85% by mass, more preferably at least 90% by mass, even more preferably at least 95% by mass, and substantially 100% by mass is especially preferred.

The rubber composition for conveyor belts of the present invention may contain the carbon black (b-3) that does not correspond to the above-mentioned component (b-1) and component (b-2), within a range not noticeably detracting from the advantageous effects of the present invention. In case where the composition contains the carbon black (b-3), the content thereof is preferably such that the total content ratio of the component (b-1) and the component (b-2) in the component (B) could fall within the above-mentioned range.

((C) Silica)

Containing silica as the component (C), the rubber composition of the present invention could be more effective for further improving the durability thereof while maintaining the energy efficiency that the rubber composition containing the component (A) and the component (B) in a specific blend ratio has. Incorporating the component (C) provides a rubber composition capable of stably exhibiting extremely high durability irrespective of the compounding order, the compounding method and the kneading condition. Though not clear, the accurate reason of expressing the effect could be presumed as follows. Specifically, silica does not have the ability to convert the energy generated by the strain of small deformation necessary for conveyor belts into heat and therefore can maintain as such or does not reduce so much the energy efficiency, however, as having the ability to convert the energy generated by the strain of large deformation into heat and to scatter it, and as a result, the durability could be thereby noticeably increased.

As the silica, any and every commercially-available one is usable here. Above all, preferred is use of wet-method silica, dry-method silica or colloidal silica, and more preferred is use of wet-method silica.

Preferably, the BET specific surface area (as measured according to ISO 5794/1) of silica for use herein is from 40 to 350 m²/g. Silica of which the BET specific surface area falls within the range is advantageous as its dispersibility in the rubber component is good and, while maintaining good energy efficiency, can exhibit an excellent effect of improving the durability of the rubber composition. From this viewpoint, the BET specific surface area of silica for use herein is more preferably from 80 to 350 m²/g, even more preferably from 120 to 350 m²/g, still more preferably from 150 to 300 m²/g.

As such silica, there may be used commercial products such as trade name "Nipsil AQ" (BET specific surface area=220 m²/g) and trade name "Nipsil KQ" produced by Tosoh Silica Corporation, and "Ultrasil VN3" (BET specific surface area=175 m²/g) produced by Degussa AG, and the like.

One alone or two or more types of such silica may be used here either singly or as combined.

In the rubber composition for conveyor belts of the present invention, the content of silica as the component (C) is preferably from 1 to 15 parts by mass relative to 100 parts by mass of the component (A). The content of at least 1 part by mass is effective for improving the durability of the composition and the content of at most 15 parts by mass would be free from the condition that the composition is roughened and could hardly be formed into sheets, or that is, the moldability of the rubber composition could be kept good. From this viewpoint, the content is more preferably from 1 to 10 parts by mass relative to 100 parts by mass of the component (A), even more preferably from 2 to 8 parts by mass, especially preferably from 2 to 6 parts by mass.

The total content of the component (B) and the component (C) is preferably from 26 to 70 parts by mass relative to 100 parts by mass of the component (A), from the viewpoint of satisfying both energy efficiency and extremely high durability, more preferably from 30 to 60 parts by mass, even more preferably from 35 to 55 parts by mass, especially preferably from 40 to 50 parts by mass.

((D) Silane Coupling Agent)

In case where the rubber composition of the present invention contains the component (C), it is desirable that a silane coupling agent is added thereto as the component (D) in order that the energy efficiency that may be lowered by the component (C) could be kept at a high level.

The silane coupling agent is preferably at least one selected from a group consisting of compounds of the following general formulae (I) to (IV). Using the silane coupling agent of the type secures more excellent workability at rubber processing and provides an effect of further improving the durability.

The general formulae (I) to (IV) are sequentially described below.

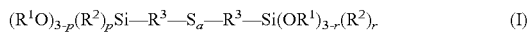

$(R^1O)_{3-p}(R^2)_p Si—R^3—S_a—R^3—Si(OR^1)_{3-r}(R^2)_r$     (I)

In the formula, plural $R^1$'s may be the same or different, each representing a linear, cyclic or branched alkyl group having from 1 to 8 carbon atoms, or a linear or branched alkoxyalkyl group having from 2 to 8 carbon atoms. Plural $R^2$'s may be the same or different, each representing a linear, cyclic or branched alkyl group having from 1 to 8 carbon atoms. Plural $R^3$'s may be the same or different, each representing a linear or branched alkylene group having from 1 to 8 carbon atoms. a indicates from 2 to 6 as a mean value; p and r may be the same or different, each indicating from 0 to 3 as a mean value. However, both p and r are not 3 at the same time.

Specific examples of the silane coupling agent represented by the above-mentioned general formula (I) include bis(3-triethoxysilylpropyl)tetrasulfide, bis(3-trimethoxysilylpropyl)tetrasulfide, bis(3-methyldimethoxysilylpropyl)tetrasulfide, bis(2-triethoxysilylethyl)tetrasulfide, bis(3-triethoxysilylpropyl)disulfide, bis(3-trimethoxysilylpropyl)disulfide, bis(3-methyldimethoxysilylpropyl)disulfide, bis(2-triethoxysilylethyl)disulfide, bis(3-triethoxysilylpropyl)trisulfide, bis(3-trimethoxysilylpropyl)trisulfide, bis(3-methyldimethoxysilylpropyl)trisulfide, bis(2-triethoxysilylethyl)trisulfide, bis(3-monoethoxydimethylsilylpropyl)tetrasulfide, bis(3-monoethoxydimethylsilylpropyl)trisulfide, bis(3-monoethoxydimethylsilylpropyl)disulfide, bis(3-monomethoxydimethylsilylpropyl)tetrasulfide, bis(3-monomethoxydimethylsilylpropyl)trisulfide, bis(3-monomethoxydimethylsilylpropyl)disulfide, bis(2-monoethoxydimethylsilylethyl)tetrasulfide, bis(2-monoethoxydimethylsilylethyl)trisulfide, bis(2-monoethoxydimethylsilylethyl)disulfide.

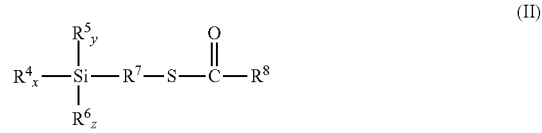

(II)

In the formula, $R^4$ represents a monovalent group selected from —Cl, —Br, $R^9O—$, $R^9C(=O)O—$, $R^9R^{10}C=NO—$, $R^9R^{10}CNO—$, $R^9R^{10}N—$, and $—(OSiR^9R^{10})_h$ $(OSiR^9R^{10}R^{11})$ (where $R^9$, $R^{10}$ and $R^{11}$ each independently represent a hydrogen atom or a monovalent hydrocarbon group having from 1 to 18 carbon atoms, and they may be the same or different. h indicates from 1 to 4 as a mean value); $R^5$ represents $R^4$, a hydrogen atom, or a monovalent hydrocarbon group having from 1 to 18 carbon atoms; $R^6$ represents $R^4$, $R^5$, a hydrogen atom, or a group $—[O(R^{12}O)_j]_{0.5}—$ (where $R^{12}$ represents an alkylene group having from 1 to 18 carbon atoms. j indicates an integer of from 1 to 4); $R^7$ represents a divalent hydrocarbon group having from 1 to 18 carbon atoms; $R^8$ represents a monovalent hydrocarbon group having from 1 to 18 carbon atoms. x, y and z each indicate a number satisfying the relationship of x+y+2z=3, 0≤x≤3, 0≤y≤2, 0≤z≤1.

In the general formula (II), $R^8$ to $R^{11}$ may be the same or different, each preferably representing a group selected from a linear, cyclic or branched alkyl, alkenyl, aryl or aralkyl group having from 1 to 18 carbon atoms.

In case where $R^5$ is a monovalent hydrocarbon group having from 1 to 18 carbon atoms, the group is preferably a group selected from a linear, cyclic or branched alkyl, alkenyl, aryl or aralkyl group. Preferably, $R^{12}$ is a linear, cyclic or branched alkylene group, and is especially preferably a linear one. The divalent hydrocarbon group having from 1 to 18 carbon atoms for $R^7$ is, for example, an alkylene group having from 1 to 18 carbon atoms, an alkenylene group having from 2 to 18 carbon atoms, a cycloalkylene group having from 5 to 18 carbon atoms, a cycloalkylalkylene group having from 6 to 18 carbon atoms, an arylene group having from 6 to 18 carbon atoms, or an aralkylene group having from 7 to 18 carbon atoms. The alkylene group and the alkenylene group may be linear or branched; and the cycloalkylene group, the cycloalkylalkylene group, the arylene group and the aralkylene group may have a substituent such as a lower alkyl group or the like on the ring thereof. Preferably, $R^7$ is an alkylene group having from 1 to 6 carbon atoms, especially preferably a linear alkylene group, for example, a methylene group, an ethylene group, a trimethylene group, a tetramethylene group, a pentamethylene group or a hexamethylene group.

Specific examples of the monovalent hydrocarbon group having from 1 to 18 carbon atoms of $R^5$, and $R^8$ to $R^{11}$ in the general formula (II) include a methyl group, an ethyl group, an n-propyl group, an isopropyl group, an n-butyl group, an isobutyl group, a sec-butyl group, a tert-butyl group, a pentyl group, a hexyl group, an octyl group, a decyl group, a dodecyl group, a cyclopentyl group, a cyclohexyl group, a vinyl group, a propenyl group, an allyl group, a hexenyl group, an octenyl group, a cyclopentenyl group, a cyclohexenyl group, a phenyl group, a tolyl group, a xylyl group, a naphthyl group, a benzyl group, a phenethyl group, a naphthylmethyl group, etc.

Examples of $R^{12}$ in the general formula (II) include a methylene group, an ethylene group, a trimethylene group, a tetramethylene group, a pentamethylene group, a hexamethylene group, an octamethylene group, a decamethylene group, a dodecamethylene group, etc.

Specific examples of the silane coupling agent represented by the general formula (II) include 3-hexanoylthiopropyltriethoxysilane, 3-octanoylthiopropyltriethoxysilane, 3-decanoylthiopropyltriethoxysilane, 3-lauroylthiopropyltriethoxysilane, 2-hexanoylthioethyltriethoxysilane, 2-octanoylthioethyltriethoxysilane, 2-decanoylthioethyltriethoxysilane, 2-lauroylthioethyltriethoxysilane, 3-hexanoylthiopropyltrimethoxysilane, 3-octanoylthiopropyltrimethoxysilane, 3-decanoylthiopropyltrimethoxysilane, 3-lauroylthiopropyltrimethoxysilane, 2-hexanoylthioethyltrimethoxysilane, 2-octanoylthioethyltrimethxysilane, 2-decanoylthioethyltrimethoxysilane, 2-lauroylthioethyltrimethoxysilane, etc. Of those, especially preferred is 3-octanoylthiopropyltriethoxysilane (General Electric Silicones' "NXT Silane").

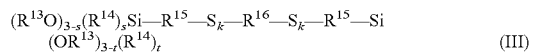

(III)

In the formula, $R^{13}$ represents a linear, cyclic or branched alkyl group having from 1 to 8 carbon atoms or a linear or branched alkoxyalkyl group having from 2 to 8 carbon atoms, and plural $R^{13}$'s may be the same or different. $R^{14}$ represents a linear, cyclic or branched alkyl group having from 1 to 8 carbon atoms, and plural $R^{14}$'s may be the same or different. $R^{15}$ represents a linear or branched alkylene group having from 1 to 8 carbon atoms, and plural $R^{15}$'s may be the same or different. $R^{16}$ represents a divalent group of any of a general formula $(-S-R^{17}-S-)$, $(-R^{18}-S_{m1}-R^{19}-)$ or $(-R^{20}-S_{m2}-R^{21}-S_{m3}-R^{22}-)$ (where $R^{17}$ to $R^{22}$ may be the same or different, each represents a divalent hydrocarbon group, a divalent aromatic group or a divalent organic group containing a hetero element except sulfur and oxygen, having from 1 to 20 carbon atoms; m1, m2 and m3 may be the same or different, each indicating from 1 to less than 4 as a mean value).

k indicates from 1 to 6 as a mean value; s and t each independently indicate from 0 to 3 as a mean value, and they may be the same or different. However, both s and t are not 3 at the same time.

Preferred examples of the silane coupling agent represented by the above-mentioned general formula (III) are compounds represented by an average compositional formula $(CH_3CH_2O)_3Si-(CH_2)_3-S_2-(CH_2)_6-S_2-(CH_2)_3-Si-(OCH_2CH_3)_3$, an average compositional formula $(CH_3CH_2O)_3Si-(CH_2)_3-S_2-(CH_2)_{10}-S_2-(CH_2)_3-Si(OCH_2CH_3)_3$, an average compositional formula $(CH_3CH_2O)_3Si-(CH_2)_3S_3-(CH_2)_6-S_3-(CH_2)_3-Si(OCH_2CH_3)_3$, an average compositional formula $(CH_3CH_2O)_3Si-(CH_2)_3-S_4-(CH_2)_6-S_4-(CH_2)_3-Si(OCH_2CH_3)_3$, an average compositional formula $(CH_3CH_2O)_3Si-(CH_2)_3-S-(CH_2)_6-S_2-(CH_2)_6-S-(CH_2)_3-Si(OCH_2CH_3)_3$, an average compositional formula $(CH_3CH_2O)_3Si-(CH_2)_3-S-(CH_2)_6-S_{2.5}-(CH_2)_6-S-(CH_2)_3-Si(OCH_2CH_3)_3$, an average compositional formula $(CH_3CH_2O)_3Si-(CH_2)_3-S_3-(CH_2)_6-S_3-(CH_2)_6-S(CH_2)_3-Si(OCH_2CH_3)_3$, an average compositional formula $(CH_3CH_2O)_3Si-(CH_2)_3-S-(CH_2)_6-S_4-(CH_2)_6-S(CH_2)_3-Si(OCH_2CH_3)_3$, an average compositional formula $(CH_3CH_2O)_3Si-(CH_2)_3-S-(CH_2)_{10}-S_2-(CH_2)_{10}-S-(CH_2)_3-Si(OCH_2CH_3)_3$, an average compositional formula $(CH_3CH_2O)_3Si-(CH_2)_3-S_4-(CH_2)_6-S_4-(CH_2)_6-S_4-(CH_2)_3-Si(OCH_2CH_3)_3$, an average compositional formula $(CH_3CH_2O)_3Si-(CH_2)_3-S_2-(CH_2)_6-S_2 (CH_2)_6-S_2-(CH_2)_3-Si(OCH_2CH_3)_3$, an average compositional formula $(CH_3CH_2O)_3Si-(CH_2)_3-S-(CH_2)_6-S_2-(CH_2)_6-S_2-(CH_2)_6-S-(CH_2)_3-Si(OCH_2CH_3)_3$, etc.

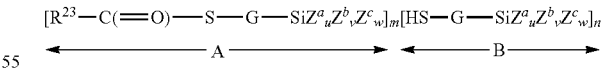

In the formula, $R^{23}$ represents a linear, branched or cyclic alkyl group having from 1 to 20 carbon atoms. G represents an alkanediyl group or an alkenediyl group having from 1 to 9 carbon atoms.

$Z^a$ represents a group capable of bonding to the two silicon atoms and selected from $[-O-]_{0.5}$, $[-O-G-]_{0.5}$ or $[-O-G-O-]_{0.5}$, and plural $Z^a$'s may be the same or different. $Z^b$ represents a group capable of bonding to the two silicon atoms and is a functional group represented by $[-O-G-O-]_{0.5}$, and plural $Z^b$'s may be the same or different. $Z^c$ represents a functional group represented by —Cl, —Br, —OR$^a$, R$^a$C(=O)O—, R$^a$R$^b$C=NO—, R$^a$R$^b$N—, R$^a$— or HO-G-O— (where G is the same as above), and plural Z$^{ca}$, may be the same or different.

R$^a$ and R$^b$ each independently represent a linear, branched or cyclic alkyl group having from 1 to 20 carbon atoms, and may be the same or different.

m, n, u, v and w each are $1 \leq m \leq 20$, $0 \leq n \leq 20$, $0 \leq u \leq 3$, $0 \leq v \leq 2$, $0 \leq w \leq 1$, and (u/2)+v+2w is 2 or 3. m, n, u, v and w each may be the same or different. In case where the formula has plural A's, then $Z^a_u$, $Z^b_v$ and $Z^c_w$ each may be the same or different in those plural A's; and in case where the formula has plural B's, then $Z^a_u$, $Z^b_v$ and $Z^c_w$ each may be the same or different in those plural B's.

The silane coupling agent represented by the general formula (IV) includes silane coupling agents represented by the following formula (V), formula (VI) and formula (VII):

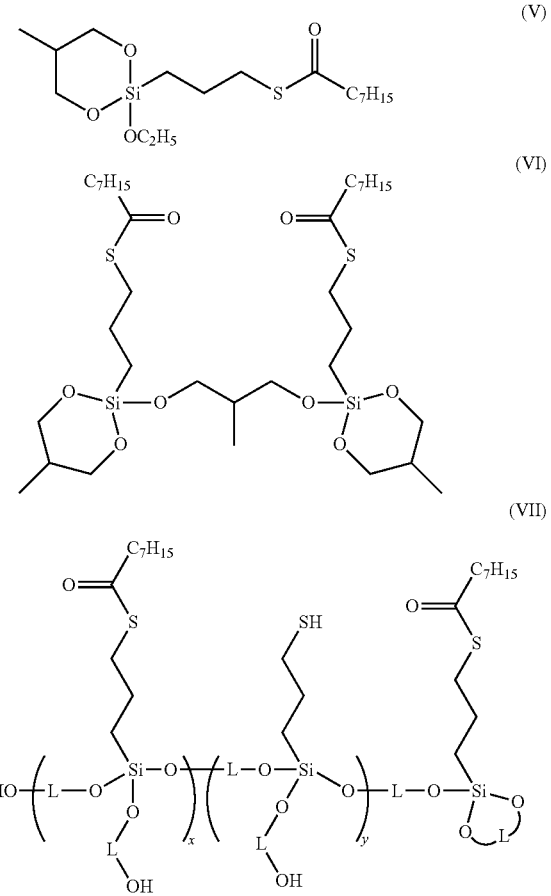

In the formula, L each independently represents an alkanediyl group or an alkenediyl group having from 1 to 9 carbon atoms, and x=m and y=n.

As the silane coupling agent represented by the formula (V), a commercial product is available as "NXT Low-V Silane" by Momentive Performance Materials.

As the silane coupling agent represented by the formula (VI), a commercial product is available as "NXT Ultra Low-V Silane" by Momentive Performance Materials.

Further, as the silane coupling agent represented by the formula (VII), a commercial product is available as "NXT-Z" by Momentive Performance Materials.

The silane coupling agent represented by the general formula (II), the formula (V) or the formula (VI) has a protected mercapto group, and is therefore effective for preventing initial scorching in the processing process in and before the vulcanization step and betters the processability of the rubber composition.

In the silane coupling agent represented by the general formula (V), (VI) or (VII), the carbon number of the alkoxysilane is large, and therefore the amount of the volatile organic compound VOC such as alcohol or the like to be generated from the agent is small, and accordingly, the agent is favorable in point of working environment. Further, the silane coupling agent of the formula (VII) is preferred from the viewpoint of energy efficiency.

Of the compounds represented by the above-mentioned general formulae (I) to (IV) as the silane coupling agent, those represented by the general formula (I) are especially preferred. This is because the polysulfide bond site that reacts with the dienic polymer being the component (A) can be easily activated by the vulcanization accelerator optionally added to the rubber composition.

In the present invention, one alone or two or more different types of the silane coupling agents may be used either singly or as combined.

In the case where a silane coupling agent is contained in the rubber composition for conveyor belts of the present invention, the content thereof is preferably from 0.1 to 1.5 parts by mass relative to the component (A), and the value is obtained from the standard of 10% by mass relative to the component (C). Within the range, the energy efficiency that may be lowered by the component (C) can be kept at a high level while maintaining high durability. From this viewpoint, the content is more preferably from 0.1 to 1 part by mass relative to 100 parts by mass of the component (A), even more preferably from 0.2 to 0.8 parts by mass, still more preferably from 0.2 to 0.6 parts by mass.

(Other Components)

Any other additive may be further added to the rubber composition for conveyor belts of the present invention, within a range not remarkably detracting from the advantageous effects of the present invention. The additive is not specifically defined so far as it can be usually contained in the cover rubber of conveyor belts. The additive includes, for example, fatty acid such as stearic acid, etc.; zinc oxide (zinc flower), antiaging agent, sulfur, vulcanization accelerator, vulcanization retardant (scorching inhibitor), oil, resin, wax, peptizing agent, ozone cracking inhibitor, antioxidant, clay, calcium carbonate, etc. These may be commercial products.

In the case where fatty acid is used, the amount to be used is preferably from 0.1 to 10 parts by mass relative to 100 parts by mass of the component (A), more preferably from 1 to 5 parts by mass.

In the case where zinc oxide is used, the amount to be used is preferably from 0.5 to 10 parts by mass relative to 100 parts by mass of the component (A), more preferably from 1 to 5 parts by mass.

As the antiaging agent, a known antiaging agent may be selected and used here. For example, there are mentioned N-phenyl-N'-(1,3-dimethylbutyl)-p-phenylenediamine (6C), N-phenyl-N'-isopropyl-p-phenylenediamine (3C), 2,2,4-trimethyl-1,2-dihydroquinoline polymer (RD), etc. In case where antiaging agent is used, its amount to be used is preferably from 0.1 to 10 parts by mass relative to 100 parts by mass of the component (A), more preferably from 0.5 to 5 parts by mass, even more preferably from 1 to 5 parts by mass.

In the case where sulfur is used, the amount to be used is preferably from 0.5 to 10 parts by mass as sulfur content relative to 100 parts by mass of the component (A), more preferably from 0.5 to 4 parts by mass.

The vulcanization accelerator is not specifically defined, and examples thereof include thiazole-based ones such as M (2-mercaptobenzothiazole), DM (dibenzothiazyl disulfide), CZ (N-cyclohexyl-2-benzothiazylsulfenamide), etc., guanidine-based ones such as DPG (diphenylguanidine), etc. In case where vulcanization accelerator is used, its amount to be used is preferably from 0.1 to 5 parts by mass relative to 100 parts by mass of the component (A), more preferably from 0.1 to 2 parts by mass.

The amount of the other additive may be suitably selected by those skilled in the art within a range not detracting from the object of the present invention.

(Production Method for Rubber Composition for Conveyor Belts)

The production method for the rubber composition for conveyor belts is not specifically defined, for which any ordinary production method is employable. For example, the component (B), optionally the component (C) and the component (D) and any other necessary additive, may be added to the component (A) and kneaded to thereby prepare the rubber composition for conveyor belts of the present invention.

The kneading method may be any ordinary method to be taken by those skilled in the art. Preferred examples thereof include the method where all the components except for sulfur and a vulcanization accelerator are kneaded, using a mixing machine such as a Banbury mixer, a Brabender mixer, a kneader, a high-shear mixer or the like, preferably at 80 to 200° C., more preferably at 100 to 180° C., even more preferably at 120 to 180° C., especially preferably at 130 to 170° C. (A-stage kneading), and then sulfur and a vulcanization accelerator are added thereto and further kneaded with a kneading roll machine or the like, preferably at 0 to 50° C., more preferably at 0 to 40° C., even more preferably at 0 to 30° C. (B-stage kneading). During the A-stage kneading, when the kneading temperature is too low, the reactivity may lower, but on the other hand, when it is too high, overreaction may occur to make the rubber hard.

Figure 2:
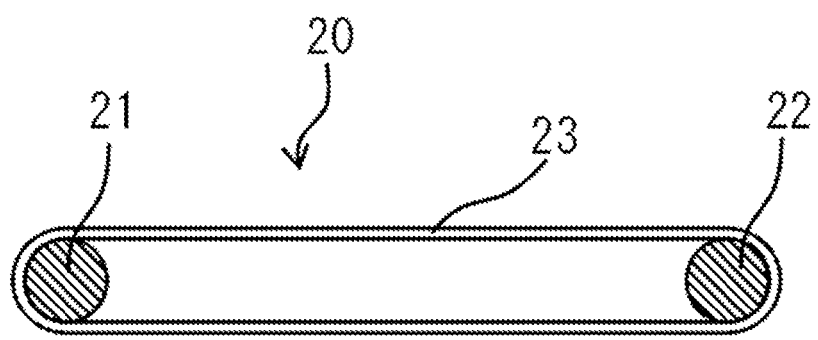
FIG. 2 is a side view of a belt conveyor in accordance with the invention.

Thus obtained, the rubber composition is vulcanized in a heating mold preferably at 80 to 200° C., more preferably at 100 to 180° C., even more preferably at 140 to 180° C. (as the mold temperature) to give a conveyor belt of the present invention (external cover rubber or internal cover rubber). Referring to FIG. 1, in general, the external cover rubber 2 and the internal cover rubber 6 are joined along with a core 4 of a reinforcing material sandwiched therebetween to give a conveyor belt 10, which is mounted to a belt conveyor. Referring to FIG. 2, a belt conveyor 20 leas generally two or more belt pulleys 21, 22 and a conveyor belt 23. The rubber composition for conveyor belts of the present invention has both energy efficiency and durability, and is therefore especially useful for the internal cover rubber of conveyor belts.

EXAMPLES

The present invention is described in more detail with reference to the following Examples; however, the present invention is not limited at all by these Examples.

The rubber composition for conveyor belts obtained in each Example was tested according to the methods mentioned below to evaluate the durability and the energy efficiency thereof.

(Durability—Tear Resistance)

A trouser-type test piece was tested for the tear force (N/mm) according to JIS K6252, which is the index of durability of the sample. In Table 1, the data are expressed as a relative value based on the tear force in Example 1 as the standard (100). In Table 2, the data are expressed as a relative value based on the tear force in Reference Example 1 as the standard (100). Samples having a larger value have more excellent durability.

(Energy Efficiency—Energy Loss Reduction)

A sheet having a length of 40 mm, a width of 5 mm and a thickness of 2 mm was formed of the rubber composition for conveyor belts obtained in each Example. The sheet was tested with a viscoelasticity spectrometer (by Toyo Seiki Seisakusho) for dynamic viscoelastometry, in which the chuck-to-chuck distance was 10 mm, the dynamic strain was 2%, the frequency was 10 Hz, and under the measurement condition, the loss tangent (tan δ) at 20° C. was measured. The dynamic elastic modulus is referred to as E' (N/mm), and $\tan \delta / E'^{0.32}$ is calculated to give the index of energy loss reduction.

In Table 1, the data are expressed as a relative value based on the reciprocal of the value in Example 1 as the standard (100). In Table 1, the samples having a larger value have more excellent energy efficiency.

On the other hand, in Table 2, the data are expressed as a relative value based on the value in Reference Example 1 as the standard (100). In Table 2, the samples having a smaller value have more excellent energy efficiency.

Examples 1 to 11 and Comparative Examples 1 to 9

All the components except for sulfur and the vulcanization accelerator were kneaded in the blend ratio shown in Table 1 by means of a Banbury mixer at 150° C. (A-stage kneading), and then sulfur and the vulcanization accelerator were added thereto and further kneaded (B-stage kneading) to give a rubber composition for conveyor belts. The rubber composition was vulcanized at a mold temperature of 160° C. for 15 minutes to give a cover rubber for conveyor belts. The durability and the energy efficiency of the thus-obtained cover rubber were evaluated. The results are shown in Table 1.

TABLE 1

| | | | Example | | | | | | | | | | | |
|---|---|---|---|---|---|---|---|---|---|---|---|---|---|---|
| | | | 1 | 2 | 3 | 4 | 5 | 6 | 7 | 8 | 9 | 10 | 11 |
| Components | (A) | NR[1] | 40 | 40 | 40 | 40 | 40 | 40 | 40 | 40 | 40 | 20 | 60 |
| | | BR[2] | 60 | 60 | 60 | 60 | 60 | 60 | 60 | 60 | 60 | 80 | 40 |
| | (B) | carbon black 1[3] | 15 | | 15 | 10 | 40 | 30 | 10 | 10 | 20 | 15 | 15 |
| | | carbon black 2[4] | | 15 | | | | | | | | | |
| | | carbon black 3[5] | 30 | 30 | 30 | 35 | 10 | 10 | 40 | 20 | 30 | 30 | 30 |
| | | carbon black 4[6] | | | | | | | | | | | |
| | | carbon black 5[7] | | | | | | | | | | | |
| | | stearic acid[8] | 3 | 3 | 3 | 3 | 3 | 3 | 3 | 3 | 3 | 3 | 3 |
| | | zinc oxide[9] | 3.5 | 3.5 | 3.5 | 3.5 | 3.5 | 3.5 | 3.5 | 3.5 | 3.5 | 3.5 | 3.5 |
| | | antiaging agent[10] | 2 | 2 | 2 | 2 | 2 | 2 | 2 | 2 | 2 | 2 | 2 |

TABLE 1-continued

|  |  |  |  |  |  |  |  |  |  |  |  |  |
|---|---|---|---|---|---|---|---|---|---|---|---|---|
|  | sulfur[11] | 2 | 2 | 2 | 2 | 2 | 2 | 2 | 2 | 2 | 2 | 2 |
|  | vulcanization accelerator[12] | 0.8 | 0.8 | 0.8 | 0.8 | 0.8 | 0.8 | 0.8 | 0.8 | 0.8 | 0.8 | 0.8 |
| Results | durability | 100 | 95 | 100 | 98 | 108 | 105 | 104 | 92 | 105 | 90 | 112 |
|  | energy efficiency | 100 | 102 | 100 | 102 | 94 | 101 | 93 | 112 | 96 | 106 | 94 |

|  |  |  | Comparative Example ||||||||| 
|---|---|---|---|---|---|---|---|---|---|---|---|
|  |  |  | 1 | 2 | 3 | 4 | 5 | 6 | 7 | 8 | 9 |
| Components | (A) | NR[1] | 35 | 35 | 35 | 35 | 35 | 35 | 35 | 35 | 35 |
|  |  | BR[2] | 65 | 65 | 65 | 65 | 65 | 65 | 65 | 65 | 65 |
|  | (B) | carbon black 1[3] | 30 |  |  | 10 |  | 15 | 15 |  | 15 |
|  |  | carbon black 2[4] |  | 30 |  |  |  |  |  |  |  |
|  |  | carbon black 3[5] |  |  | 30 | 10 |  |  |  | 15 | 15 |
|  |  | carbon black 4[6] |  |  |  |  | 15 | 30 |  | 30 |  |
|  |  | carbon black 5[7] |  |  |  |  | 30 |  | 30 |  | 30 |
|  |  | stearic acid[8] | 3 | 3 | 3 | 3 | 3 | 3 | 3 | 3 | 3 |
|  |  | zinc oxide[9] | 3.5 | 3.5 | 3.5 | 3.5 | 3.5 | 3.5 | 3.5 | 3.5 | 3.5 |
|  |  | antiaging agent[10] | 2 | 2 | 2 | 2 | 2 | 2 | 2 | 2 | 2 |
|  |  | sulfur[11] | 2 | 2 | 2 | 2 | 2 | 2 | 2 | 2 | 2 |
|  |  | vulcanization accelerator[12] | 0.8 | 0.8 | 0.8 | 0.8 | 0.8 | 0.8 | 0.8 | 0.8 | 0.8 |
| Results |  | durability | 89 | 76 | 65 | 45 | 42 | 112 | 75 | 109 | 69 |
|  |  | energy efficiency | 104 | 108 | 112 | 119 | 102 | 78 | 105 | 80 | 110 |

The components in Table 1 are described in detail hereinunder.
[1] Natural rubber, grade: RSS-3
[2] T0700 (product name), high- cis butadiene rubber, by JSR
[3] Showblack N330 (HAF), by Cabot Japan, nitrogen-adsorbing specific surface area 82 $m^2/g$ and dibutyl phthalate oil absorption 102 ml/100 g, component (b-i)
[4] Sheast 300 (HAFLS), by Tokai Carbon, nitrogen-adsorbing specific surface area 84 $m^2/g$ and dibutylphthalate oil absorption 72 ml/100 g, component (b- i)
[5] Asahi #65 (FEF), byAsahi Carbon, nitrogen-adsorbingspecific surface area 42 $m^2/g$ and dibutyl phthalate oil absorption 121 ml/100 g, component (b-2)
[6] Sheast 6, nitrogen-adsorbing specific surface area 119 $m^2/g$ and dibutylphthalate oil absorption 114 ml/100 g, by Tokai Carbon
[7] Asahi #55-HP, nitrogen-adsorbing specific surface area 30 $m^2/g$ and dibutyl phthalate oil absorption 90 ml/100 g, by Asahi Carbon
[8] Stearic Acid 300 (product name), by New Japan Chemical
[9] Zinc flower, by Toho Zinc
[10] Noclac 6C (product name), by Ouchi Shinko Chemical industry
[11] General sulfur, Sulfax Z, by Tsurumi Chemical Industry
[12] Nocceler NS-F, by Ouchi Shinko Chemical Industry From Table 1, it is known that the rubber compositions for belt conveyors of the present invention satisfy both energy efficiency and durability.

On the other hand, in the case containing the component (b-1) alone as the component (B) like in Comparative Examples 1 and 2, and in the case containing the component (b-2) alone as the component (B) like in Comparative Example 3, the durability greatly lowered. Further, also in the case where the total content of the component (B) relative to 100 parts by mass of the component (A) is less than 25 parts by mass like in Comparative Example 4, the durability greatly lowered. Also in the case where the carbon blacks combined did not correspond to any of the component (b-1) and the component (b-2) defined in the present invention, like in Comparative Example 5, the durability greatly lowered. Further, in the case where any one of the component (b-1) or the component (b-2) was used but the carbon black combined with it did not correspond to any of the component (b-1) and the component (b-2) defined in the present invention, like in Comparative Examples 6 to 8, it was impossible to satisfy both durability and energy efficiency. Further, in the case where the content of the component (B) was more than 55 parts by mass relative to 100 parts by mass of the component (A), like in Comparative Example 9, the durability greatly lowered.

Reference Example 1, Examples 12 to 17, and Comparative Examples 10 to 15

Cover rubber for conveyor belts was produced in the same manner as above, except that the components shown in Table 2 were used in the blend ration (unit: part by mass) shown therein. The durability and the energy efficiency of the obtained cover rubber were evaluated. The results are shown in Table 2.

TABLE 2

|  |  |  | Reference | Example |||||| Comparative Example ||||||
|---|---|---|---|---|---|---|---|---|---|---|---|---|---|---|---|
|  |  |  | Example 1 | 12 | 13 | 14 | 15 | 16 | 17 | 10 | 11 | 12 | 13 | 14 | 15 |
| Components | (A) | NR[1] | 40 | 40 | 40 | 20 | 60 | 40 | 40 | 40 | 40 | 40 | 40 | 40 | 40 |
|  |  | BR[2] | 60 | 60 | 60 | 80 | 40 | 60 | 60 | 60 | 60 | 60 | 60 | 60 | 60 |
|  | (B) | carbon black 1[3] | 25 | 25 |  | 25 | 25 | 25 | 25 | 45 |  |  | 15 | 15 |  |
|  |  | carbon black 2[4] |  |  | 25 |  |  |  |  |  |  |  |  |  |  |
|  |  | carbon black 3[5] | 20 | 15.8 | 15.8 | 15.8 | 15.8 | 15.8 | 15.8 |  | 45 |  |  |  | 15 |
|  |  | carbon black 4[6] |  |  |  |  |  |  |  |  |  | 15 | 30 |  | 30 |
|  |  | carbon black 5[7] |  |  |  |  |  |  |  |  |  | 30 |  | 30 |  |
|  | (C) | Silica[8] |  | 4.2 | 4.2 | 4.2 | 4.2 | 15 | 4.2 |  |  | 4.2 | 4.2 | 4.2 | 4.2 |
|  | (D) | silane coupling agent[9] |  | 0.4 | 0.4 | 0.4 | 0.4 | 0.4 | 1.5 |  |  | 0.4 | 0.4 | 0.4 | 0.4 |
|  |  | stearic acid[10] | 3 | 3 | 3 | 3 | 3 | 3 | 3 | 3 | 3 | 3 | 3 | 3 | 3 |

TABLE 2-continued

|  |  | Reference Example 1 | Example 12 | Example 13 | Example 14 | Example 15 | Example 16 | Example 17 | Comparative Example 10 | Comparative Example 11 | Comparative Example 12 | Comparative Example 13 | Comparative Example 14 | Comparative Example 15 |
|---|---|---|---|---|---|---|---|---|---|---|---|---|---|---|
|  | zinc oxide[11] | 3.5 | 3.5 | 3.5 | 3.5 | 3.5 | 3.5 | 3.5 | 3.5 | 3.5 | 3.5 | 3.5 | 3.5 | 3.5 |
|  | antiaging agent[12] | 2 | 2 | 2 | 2 | 2 | 2 | 2 | 2 | 2 | 2 | 2 | 2 | 2 |
|  | sulfur[13] | 2 | 2 | 2 | 2 | 2 | 2 | 2 | 2 | 2 | 2 | 2 | 2 | 2 |
|  | vulcanization accelerator[14] | 0.8 | 0.8 | 0.8 | 0.8 | 0.8 | 0.8 | 0.8 | 0.8 | 0.8 | 0.8 | 0.8 | 0.8 | 0.8 |
| Results | durability | 100 | 169 | 158 | 140 | 171 | 175 | 95 | 119 | 37 | 72 | 172 | 45 | 132 |
|  | energy efficiency | 100 | 104 | 106 | 96 | 110 | 118 | 92 | 114 | 91 | 122 | 130 | 90 | 125 |

The components in Table 2 are described in detail hereinunder.
[1] Natural rubber, grade: RSS-3
[2] T0700 (product name), high-cis butadiene rubber, by JSR
[3] Showblack N330 (HAF), nitrogen-adsorbing specific surface area 82 m+hu 2+l /g and DEP oil absorption 102 ml/100 g, by Cabot Japan, component (b-i)
[4] Sheast 300 (HAF-LS), nitrogen-adsorbing specific surface area 84 m$^2$/g and DEP oil absorption 72 ml/100 g, by Tokai Carbon, component (b-i)
[5] Asahi #65 (FEF), nitrogen-adsorbing specific surface area 42 m$^2$/g and DEP oil absorption 121 ml/100 g, by Asahi Carbon, component (b-2)
[6] Sheast 6, nitrogen-adsorbing specific surface area 119 m$^2$/g and DEP oil absorption 114 ml/100 g, by Tokai Carbon, component (b-3)
[7] Asahi #55-HP, nitrogen-adsorbing specific surface area 30 m+hu 2+l /gandDBP oil absorption 9Oml/100 g, byAsahi Carbon, component (b-3)
[8] Nipseal AQ (product name), BET surface area 220 m$^2$/g, by Tosoh Silica
[9] 5169 (product name), bis(3-triethoxysilylpropyl) tetrasulfide, by Evonik Degussa Japan
[10] Stearic Acid 300 (product name), by New Japan Chemical
[11] Zinc flower, by Toho Zinc
[12] Noclac 6C (product name), by Ouchi Shinko Chemical industry
[13] General sulfur, Sulfax Z, by Tsurumi Chemical Industry
[14] Nocceler NS-F, by Ouchi Shinko Chemical Industry From Table 2, it is known that the rubber compositions for belt conveyors of the present invention further containing the component (C) and the component (D) each in a specific amount satisfy both energy efficiency and extremely high durability.

On the other hand, in the case containing the component (b-1) alone as the component (B) and not containing silica as the component (C), like in Comparative Example 10, the energy efficiency was poor. In the case containing the component (b-2) alone as the component (B) and not containing silica as the component (C), like in Comparative Example 11, the durability greatly lowered.

In the case not containing both the component (b-1) and the component (b-2) as the component (B) but containing carbon black 4 and carbon black 5 as the component (b-3), like in Comparative Example 12, the durability greatly lowered and the energy efficiency was poor, even though the composition contained the component (C) and the component (D). In the case where carbon black 4 of the component (b-3) was used in place of the component (b-2), like in Comparative Example 13, the energy efficiency greatly lowered, even though the composition contained the component (C) and the component (D). In the case where carbon black 5 of the component (b-3) was used in place of the component (b-2), like in Comparative Example 14, the durability greatly lowered, even though the composition contained the component (C) and the component (D). Further, in the case where carbon black 4 of the component (b-3) was used in place of the component (b-1), like in Comparative Example 15, the energy efficiency greatly lowered, even though the composition contained the component (C) and the component (D).

INDUSTRIAL APPLICABILITY

The rubber composition of the present invention is excellent in both energy efficiency and durability, and is therefore useful for conveyor belts, especially for the internal cover rubber of conveyor belts.

The invention claimed is:

1. A rubber composition for conveyor belts, comprising:
   (A) 100 parts by mass of a dienic polymer, and
   (B) from 25 to 55 parts by mass of carbon black including carbon black (b-1) having a nitrogen-adsorbing specific surface area of from 60 to 100 m$^2$/g and a dibutyl phthalate oil absorption of less than 110 ml/100 g, and carbon black (b-2) having a nitrogen-adsorbing specific surface area of less than 60 m$^2$/g and a dibutyl phthalate oil absorption of at least 110 ml/100 g.

2. The rubber composition for conveyor belts according to claim 1, wherein the content ratio [(b-1)/(b-2)] of the carbon black (b-1) to the carbon black (b-2) is, by mass ratio, from 20/80 to 80/20.

3. The rubber composition for conveyor belts according to claim 1, further comprising:
   (C) from 1 to 15 parts by mass of silica, and
   (D) from 0.1 to 1.5 parts by mass of a silane coupling agent.

4. The rubber composition for conveyor belts according to claim 1, wherein the component (A) comprises from 15 to 65% by mass of at least one selected from natural rubber and isoprene rubber, and from 85 to 35% by mass of butadiene rubber.

5. The rubber composition for conveyor belts according to claim 4, wherein the cis-1,4-bond content in the butadiene rubber is at least 90%.

6. The rubber composition for conveyor belts according to claim 1, further comprising from 0.1 to 10 parts by mass of an antiaging agent.

7. A conveyor belt obtained using the rubber composition of claim 1.

8. A belt conveyor having, mounted thereto, the conveyor belt of claim 7.

* * * * *